United States Patent [19]

Lee et al.

[11] 4,425,483

[45] Jan. 10, 1984

[54] ECHO CANCELLATION USING TRANSVERSAL FILTERS

[75] Inventors: Pok F. Lee, Richmond; John A. Bond, Ottawa, both of Canada

[73] Assignee: Northern Telecom Limited, Montreal, Canada

[21] Appl. No.: 310,501

[22] Filed: Oct. 13, 1981

[51] Int. Cl.³ .............................................. H04B 3/20
[52] U.S. Cl. ............................... 179/170.2; 179/170.8; 179/175.31 E
[58] Field of Search ............... 179/170.2, 170.6, 170.8, 179/175.31 E; 364/724

[56] References Cited

U.S. PATENT DOCUMENTS

| | | | |
|---|---|---|---|
| 3,465,106 | 9/1969 | Nagata et al. | 179/170.2 |
| 3,588,385 | 6/1971 | Moye | 179/170.2 |
| 3,735,055 | 5/1973 | Thomas | 179/170.2 |
| 3,860,768 | 1/1975 | Wehrmann | 179/170.2 |
| 4,126,770 | 11/1978 | Sato et al. | 179/170.2 |

FOREIGN PATENT DOCUMENTS

| | | | |
|---|---|---|---|
| 2008903 | 6/1979 | United Kingdom | 179/170.2 |
| 2050126 | 12/1980 | United Kingdom | 179/175.31 E |

OTHER PUBLICATIONS

Y. Kato et al.; "A Digital Adaptive Echo Canceller"; NEC Research and Development; No. 31; Oct. 1973; pp. 32–41.

*Primary Examiner*—A. D. Pellinen
*Assistant Examiner*—Randall P. Myers
*Attorney, Agent, or Firm*—R. John Haley

[57] ABSTRACT

A transversal filter echo canceller includes two stores each for storing a set of coefficients for the transversal filter. The suitability of a set of coefficients stored in one of the stores is checked by supplying a pulse to the receive path and transversally filtering it, and comparing the level of the resultant transmit path signal, after subtraction of the transversally filtered pulse, with a threshold. At the same time the impulse response before the subtraction is stored in the other store. If the threshold is exceeded the functions of the two stores are interchanged and the check is repeated. The checking can be effected only once for a transmission line not subject to change, or, in the case of a transmission line which is subject to change, at the start of each telephone connection established via the line and optionally during conversation pauses during the connection.

13 Claims, 7 Drawing Figures

ECHO CANCELLATION USING TRANSVERSAL FILTERS

This invention relates to echo cancellers, and to a method of checking stored coefficients for a transversal filter in an echo canceller.

In order to inhibit transmission of receive path echo signals via the transmit path of a four-wire transmission line which is connected via a hybrid circuit to a two-wire transmission line, it is known to provide an echo canceller comprising a transversal filter which is supplied with the receive path signals, and means for subtracting the output of the transversal filter from the transmit path signals to effect echo cancellation. Coefficients for the transversal filter, which correspond to the impulse response of the hybrid circuit, are stored in a memory after being produced by supplying a pulse to the receive path.

For example, in Nagata et al. U.S. Pat. No. 3,465,106 issued Sept. 2, 1969, there is disclosed such an echo canceller in which a pulse is supplied to the receive path, to determine the transversal filter coefficients, in response to the termination of the ring-back tone during a supposedly silent period before the beginning of a telephone conversation.

However, such arrangements do not ensure that the transversal filter coefficients are properly determined. Thus in the event that noise is present, for example background noise or noise due to lightning or from switching equipment, during the time that the coefficients are being determined, an incorrect set of coefficients will be determined resulting in ineffective echo cancellation. Furthermore, if the characteristics of the telephone connection change during the course of a telephone call and hence after the coefficients have been determined, for example due to the use of a different telephone extension, then the echo cancellation may be adversely affected because the stored coefficients do not properly represent the impulse response of the hybrid circuit after this change.

Accordingly, an object of this invention is to provide an improved echo canceller, and a method of checking stored coefficients for a transversal filter in an echo canceller, which enable these disadvantages to be reduced or avoided.

According to this invention there is provided a method of checking stored coefficients for a transversal filter in an echo canceller in which echoes on a transmit path of signals on a receive path are cancelled by transversally filtering the receive path signals using said coefficients and subtracting the output of the transversal filter from signals on the transmit path, said method comprising: supplying a pulse to the receive path, transversally filtering said pulse using said coefficients, and subtracting the transversally filtered pulse from the resultant impulse response signal on the transmit path; comparing the transmit path signal after said subtraction with a threshold; and changing said stored coefficients if said threshold is exceeded.

Thus in accordance with the invention a pulse is supplied to the receive path and is transversally filtered using the stored coefficients which are to be checked, and the level of the subtracted output on the transmit path is compared with a threshold to determine whether or not the stored coefficients are suitable.

The method preferably comprises determining and storing coefficients for the transversal filter from said resultant impulse response signal on the transmit path before said subtraction, and changing said stored coefficients by replacing them with these determined and stored coefficients. This provides a particularly rapid and convenient method of updating the stored coefficients when necessary. The checking can then be repeated until the threshold is not exceeded, at which time it is ensured that the stored coefficients being used for the transversal filter are suitable to provide effective echo cancellation.

Preferably said checking is effected in response to an off-hook indication at the start of a telephone connection established via said receive and transmit paths. Thus the echo cancellation is made effective at the start of a connection before conversation begins. In addition, in order to accommodate changes during the course of a telephone connection, said checking can be effected during conversation pauses during the telephone connection, the method further comprising comparing the receive path signals with a threshold to determine said conversation pauses. A check can be made during each conversation pause or only during selected or occasional pauses.

In the case of echo cancellers used on transmission paths which do not vary for different connections, for example inter-office trunks, checking of the coefficients is required only on initial setting-up of the echo canceller. In this case the method preferably comprises transferring the checked, stored coefficients to a non-volatile memory when said threshold is not exceeded.

The receive path is preferably interrupted on its incoming side during the supply of the pulse to the receive path and during the comparison, in order to prevent far-end signals which may occur from interfering with the checking process.

The invention also provides an echo canceller, for cancelling echoes on a transmit path of signals on a receive path, comprising: a transversal filter having an input coupled to the receive path; means for subtracting output signals of the transversal filter from signals on the transmit path; means for supplying pulses to the receive path, whereby said pulses are also supplied to the transversal filter; means for deriving a set of coefficients for the transversal filter from the impulse response, on the transmit path before the subtracting means, resulting from each pulse supplied to the receive path; first and second stores each for storing a set of coefficients for the transversal filter; means for comparing the impulse response, on the transmit path after the subtracting means, with a threshold; and control means for controlling said supplying means to supply a pulse to the receive path and for selecting one of said stores to supply a stored set of coefficients to the transversal filter and the other of said stores to store the set of coefficients derived from the resultant impulse response, and for interchanging the selection of said stores and repeating these steps if the comparing means establishes that said threshold is exceeded.

Each of said stores conveniently comprises either a random access memory or a shift register.

The invention will be further understood from the following description with reference to the accompanying drawings, in which.

Figure 1:
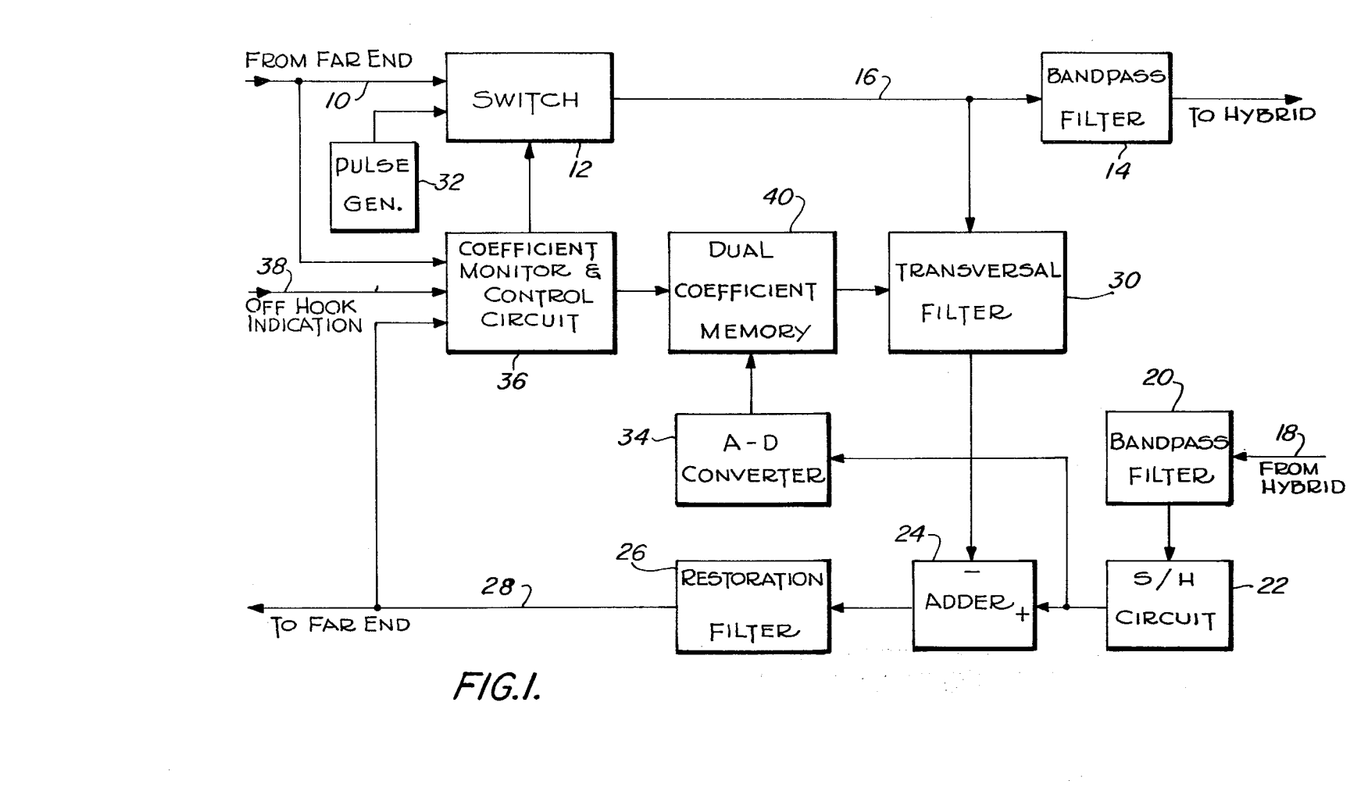
FIG. 1 illustrates an echo canceller including a transversal filter.

Referring to FIG. 1, there is shown an echo canceller which is connected to the receive and transmit paths of a four-wire transmission line which is coupled to a two-wire line via a hybrid circuit (not shown). As is known in such an arrangement, the receive path 10 incoming from the far end of the transmission line is coupled via a normally closed switch 12 to the outgoing receive path 16, which is coupled via a voice frequency bandpass filter 14 to the hybrid circuit. The transmit path 18 incoming from the hybrid circuit is coupled via a voice frequency bandpass filter 20 and a sample-and-hold circuit 22 to a non-inverting input of an adder 24, whose output is coupled via a restoration filter 26 to the transmit path 28 outgoing to the far end of the transmission line. A transversal filter 30 is coupled between the receive path 16 and an inverting input of the adder 24 (alternatively, the input of the transversal filter could be connected to the output side of the bandpass filter 14). The switch 12 can be operated to interrupt the receive path 10 from the far end and supply to the receive path 16 a pulse from a pulse generator 32, thereby producing on the transmit path 18 an impulse response of the hybrid circuit and the two-wire line connected thereto (slightly modified by the presence of the two bandpass filters 14 and 20). This impulse response is converted by an analog-to-digital converter (ADC) 34 into a set of coefficients for the transversal filter 30.

In the prior art the switch 12 has been operated at the start of a telephone conversation, for example on detection of termination of the ring back tone, and the resulting digital coefficients produced by the ADC 34 have been stored in a memory. In contrast, in accordance with the present invention a coefficient monitor and control circuit 36 controls the switch 12 in dependence upon an off-hook indication supplied via a line 38 and in dependence upon signal levels on the receive path 10 and the transmit path 28. In addition, a dual coefficient memory 40 is provided which is controlled by the circuit 36 and which includes two memories each of which can store a set of coefficients from the transversal filter 30. These units and their operation are described in detail below.

Figure 2:
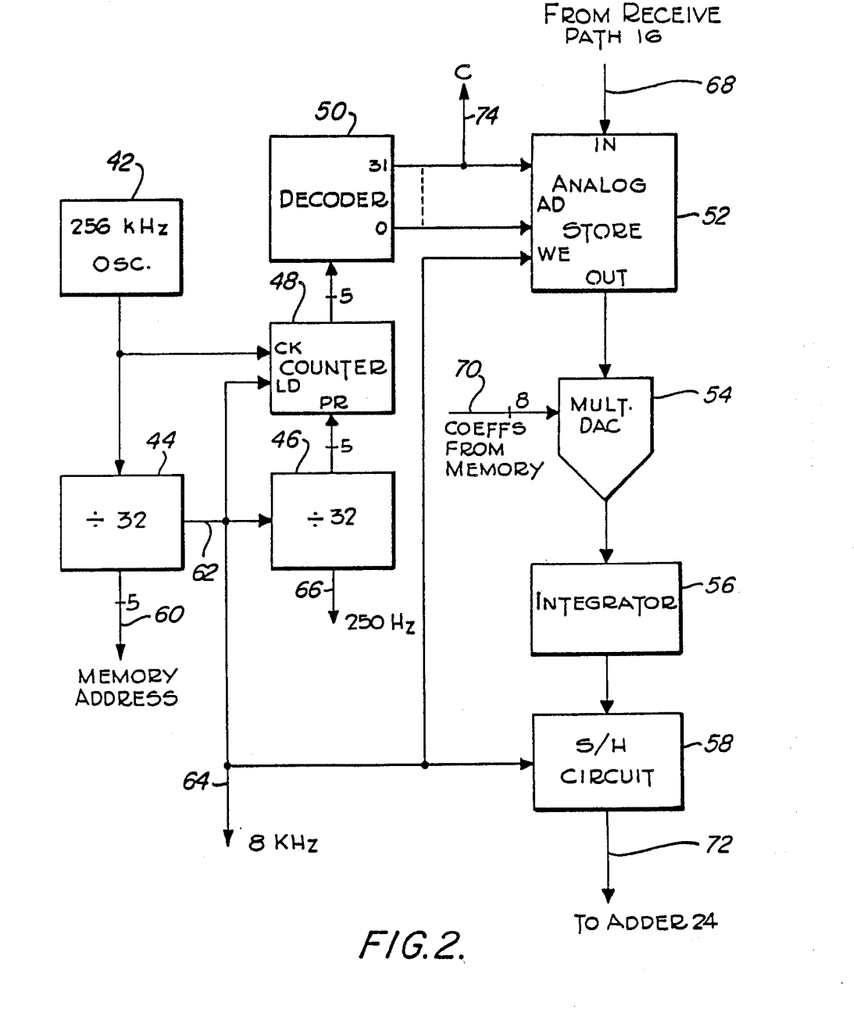
FIG. 2 illustrates the transversal filter in more detail.

Although any suitable transversal filter can be used, a preferred form of the transversal filter 30 is shown in FIG. 2. This filter comprises a 256 kHz oscillator 42, counter-frequency dividers 44 and 46, a 5-bit counter 48, a count decoder 50, an analog store 52, a multiplying digital-to-analog converter (MDAC) 54, an integrator 56, and a sample-and-hold circuit 58.

The 256 kHz output of the oscillator 42 is supplied to a clock input CK of the counter 48, and is also counted and divided in frequency by a factor of 32 by the unit 44 to provide a 5-bit memory address, which cyclically recurs at a frequency of 8 kHz, on lines 60 and an 8 kHz signal on a line 62. The 8 kHz signal is supplied to a load input LD of the counter 48, a write enable input WE of the analog store 52, the sample-and-hold circuit 58, the counter-frequency divider 46, and via a line 64 to the ADC 34 to synchronize its operation. The counter-frequency divider 46 counts the 8 kHz signal and divides its frequency by a factor of 32 to provide a 5-bit count, which cyclically recurs at a frequency of 250 Hz, which is supplied to preset inputs PR of the counter 48, and a 250 Hz signal on a line 66. The 250 Hz signal is used as described below and in addition to synchronize and trigger the pulse generator 32 to produce a pulse of 8 $\mu$s duration every 4 ms.

The 5-bit count of the counter 48 is decoded by the decoder 50 to a 1-of-32 address which is supplied to address inputs AD of the analog store 52, which comprises 32 capacitive storage elements each selected by a respective address. The store 52 has its input coupled via a line 68 to the outgoing receive path 16 and its output connected to an analog signal input of the MDAC 54, which also has a digital signal input which is supplied via lines 70 with 8-bit digital transversal filter coefficients from memory, as described below. The output of the MDAC 54 is integrated by the integrator 56, whose output is sampled by the circuit 58 to produce a signal on a line 72 for subtraction from the transmit path signal in the adder 24. A further output timing signal C from the transversal filter is supplied via a line 74 from an output of the decoder 50, this signal occurring at the end of each address cycle for the analog store 52.

In operation, a sample of the receive path signal is stored at a different location in the analog store 52 every 125 $\mu$s under the control of the 8 kHz signal supplied to the input WE of the store. The addressing of the different location every 125 $\mu$s is achieved by incrementing the count of the counter-frequency divider 46 and loading this count into the counter 48 under the control of the 8 kHz signal on the line 62. During each 125 $\mu$s period the counter 48 counts through all of its 32 states so that each location of the analog store is addressed in turn. Simultaneously, under the control of the 256 kHz signal or the memory address on the lines 60 as described below, 32 digital transversal filter coefficients are supplied in turn from memory via the lines 70 to the MDAC 54. In this manner the receive path signal is continuously transversally filtered over a 4 ms period, the transversally filtered signal being derived from the output of the MDAC 54 by integration and sampling, in the units 56 and 58 respectively, every 125 $\mu$s period.

Figure 3:
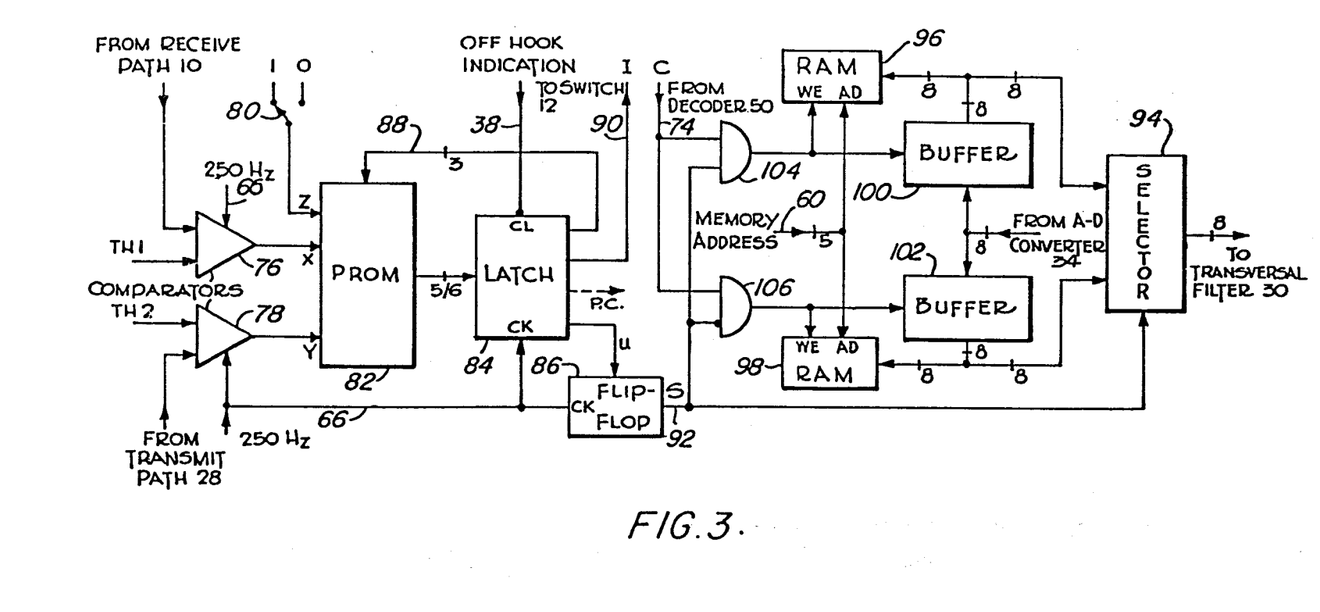
FIG. 3 illustrates a coefficient monitor and control circuit and one form of a dual coefficient memory of the echo canceller of FIG. 1.

FIG. 3 shows the circuit 36, and one form of the memory 40, in more detail. The circuit 36 comprises two comparators 76 and 78, a switch 80, a programmable read-only memory (PROM) 82, a latch 84, and a D flip-flop 86. The 250 Hz signal on the line 66 is supplied to clock inputs CK of the latch 84 and the flip-flop 86, and to control inputs of the comparators 76 and 78. The comparator 76 compares the far end signal from the incoming receive path 10 with a threshold TH1 to produce a signal X at its output. The comparator 78 compares the near end signal from the outgoing transmit path 28 with a threshold TH2 to produce a signal Y at its output. Each of the signals X and Y is a logic 1 if at any time during the preceding 4 ms period determined by the 250 Hz signal the relevant signal exceeded the respective threshold.

The PROM 82 is addressed with the signals X and Y from the comparators 76 and 78, a signal Z which is a logic 1 or 0 selected by the switch 80 to determine either of two different modes of operation as described below, and a 3-bit previous state signal supplied from the latch 84 via lines 88, to produce a 5 or 6 bit output comprising a 3-bit current state signal, a signal I for controlling the switch 12 via a line 90, a signal U, and optionally a program command PC referred to further below. The PROM output is latched in the latch 84 under the control of the 250 Hz signal on the line 66. The latch is cleared in the absence of an off hook indication on the line 38. The signal U from the latch 84 is supplied to the data input of the flip-flop 86, which produces a memory selection signal S on a line 92 connected to its output. The operation of this circuit is described below.

The dual coefficient memory 40 comprises two individual memories one of which is selected for read-out by a selector 94 under the control of the signal S on the line 92. In the form shown in FIG. 3, each individual memory comprises a 32×8-bit RAM 96 or 98 having address inputs AD which are supplied with the memory address on the lines 60 and also having a write enable input WE, an 8-bit tristate buffer 100 or 102, and a gate 104 or 106 which is supplied with the signals C and S and whose output controls the write enable input WE of the respective RAM and the respective buffer. The memory 40 is such that each time that the signal C on the line 74 from the decoder 50 is a logic 1, i.e. every 125 μs, a digital signal supplied from the ADC 34 to the buffers 100 and 102 is written into that RAM 96 or 98, determined by the signal S, which is not currently selected for read-out by the signal S and selector 94, at a respective memory address supplied via the lines 60.

Figure 4:
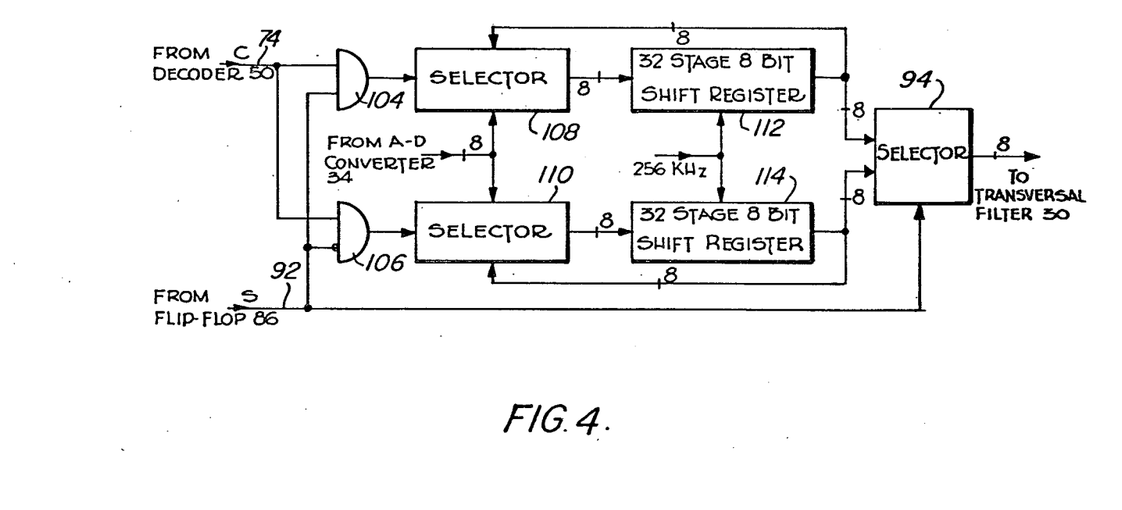
FIG. 4 illustrates an alternative form of the dual coefficient memory.

An alternative form of the dual coefficient memory 40, which is better suited to integrated circuit implementation, is shown in FIG. 4 and comprises 8-bit selectors 108 and 110 and 32-stage 8-bit shift registers 112 and 114 in place of the RAMs 96 and 98 and buffers 100 and 102 in FIG. 3. The memory of FIG. 4 also comprises the selector 94 and the gates 104 and 106, which operate in the same manner as in FIG. 3. In the memory of FIG. 4, in each individual memory the selector 108 or 110 is controlled by the gate 104 or 106 to supply either the output of the shift register 112 or 114 or the digital signal from the ADC 34 to the input of the shift register. In this case the shift registers are clocked by the 256 kHz signal from the oscillator 42.

It can be seen, therefore, that the two alternative forms of the dual coefficient memory 40 shown in FIGS. 3 and 4 are equivalent. In each case, the signal S selects one of the individual memories for read-out of its coefficients via the selector 94 to the transversal filter, while permitting writing of another set of coefficients into the other one of the individual memories from the ADC 34.

Figure 5:
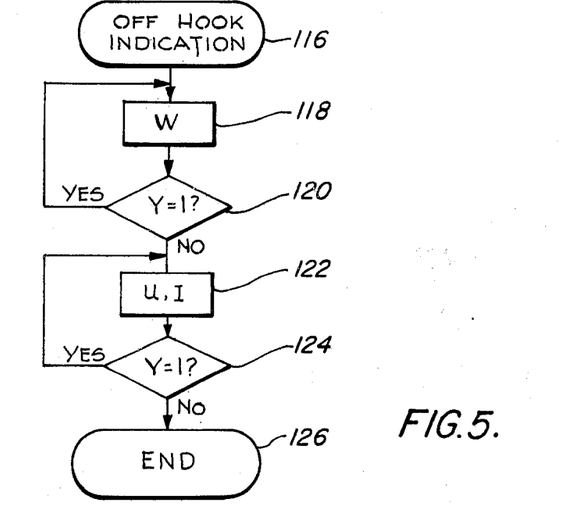
FIGS. 5 and 6 are flow charts illustrating the operation of the echo canceller.
Figure 6:
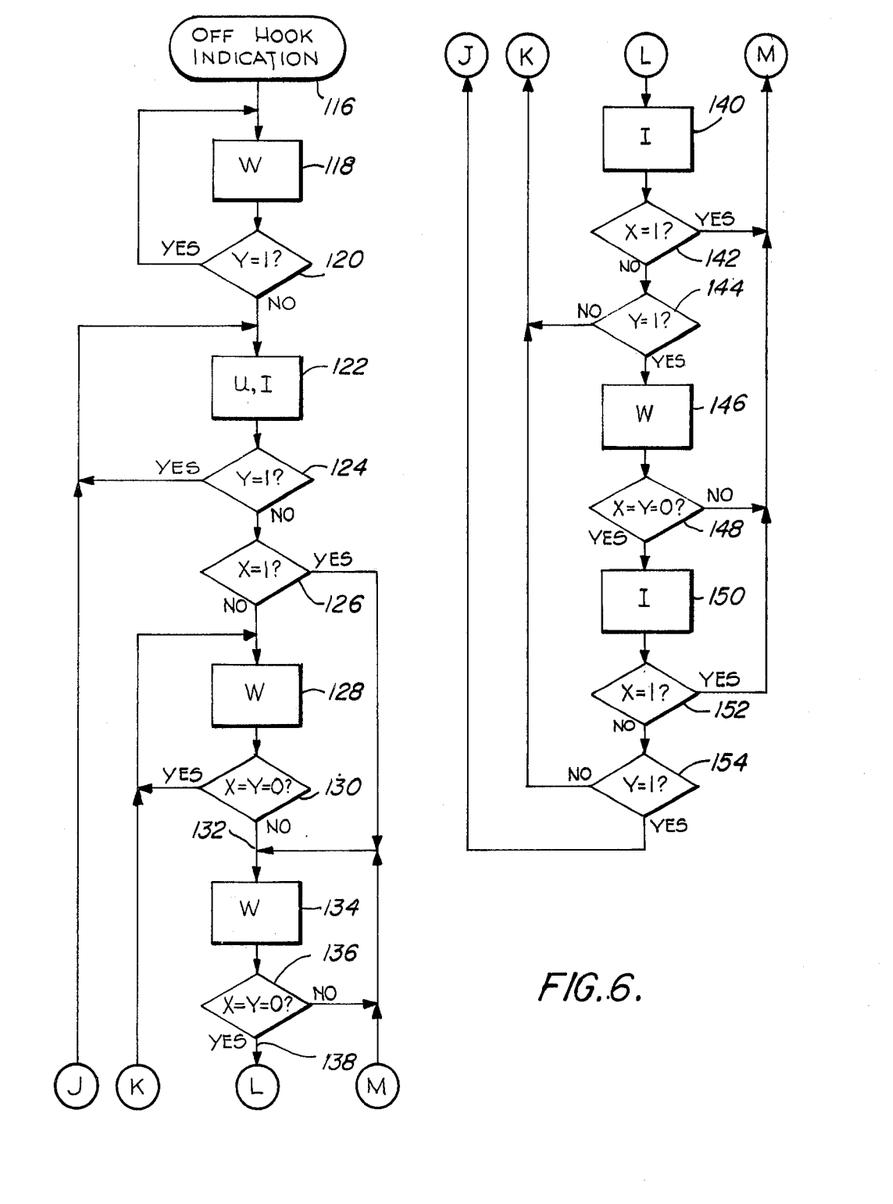

The operation of the echo canceller is described below with reference to FIGS. 5 and 6. FIG. 5 relates to operation in which the transversal filter coefficients are determined and checked once per telephone call in response to an off hook indication, and corresponds to the switch 80 being set to the position shown in which the signal Z=1. FIG. 6 relates to operation in which the transversal filter coefficients are determined and checked throughout a call, during silent intervals, and corresponds to the switch 80 being set to its other position in which the signal Z=0. In FIGS. 5 and 6, the signals X and Y are the outputs of the comparators 76 and 78 as shown in FIG. 3, U represents that the selection of the individual memories of the dual coefficient memory 40 is changed by means of the signal U, I represents the supply of a pulse from the pulse generators 32 to the receive path 16 as a result of changing the position of the switch 12 by means of the signal I, and W represents a wait period of 4 ms.

Referring to FIG. 5, for the signal Z=1, in response to an off hook indication 116 on the line 38, following a wait period 118 of 4 ms the signal Y is interrogated at block 120. The signal Y indicates whether or not the near end signal on the transmit path 28 exceeded the threshold TH2 during the 4 ms wait period, i.e. whether or not the near end signal was substantially silent. The threshold TH2 is, for example, set to −28 dBm. If the signal Y=1, indicating that the near end was not silent, another wait period 118 is started and the interrogation 120 is repeated. When the interrogation establishes that Y=0, then by means of the signals U and I at block 122 the selection of the individual memories of the dual coefficient memory 40 is changed, the receive path 10 is interrupted by the switch 12 and one 8 μs pulse is supplied to the receive path 16, and the impulse response of the hybrid circuit is stored in one of the individual memories during the next 4 ms. During this storage of the impulse response in one memory, transversal filter coefficients are supplied from the other memory to the transversal filter. These coefficients are generally coefficients in respect of a previous connection which have previously been stored and which may or may not correspond to the impulse response for the current connection via the hybrid circuit.

At the end of the 4 ms impulse response storage period, the signal Y is again interrogated at block 124. If the signal Y=0, this indicates that the coefficients which were already stored correspond to the current impulse response and accordingly that no further action is necessary to effect satisfactory echo cancellation. Accordingly, no further action (block 126) is taken during this connection. Alternatively, if the signal Y=1, this indicates that the pulse supplied to the receive path 16 has not been effectively cancelled by the echo canceller, and/or that the near end signal has not been silence, and that different transversal filter coefficients should be used. In this case a return is made to the block 122 to interchange the functions of the memories of the dual coefficient memory 40 and to supply a checking pulse to the receive path 16. In this case the newly stored filter coefficients are supplied to the transversal filter, and as already described another set of coefficients corresponding to the current impulse response is stored and the signal Y again interrogated. These steps continue until the signal Y=0.

Thus in response to the off hook indication, the stored set of coefficients is checked in respect of the new connection, and is updated and checked again as necessary until the threshold TH2 is no longer exceeded, ensuring effective echo cancellation even in the presence of intermittent noise in the near end signal.

Referring to FIG. 6, for the signal Z=0, the transversal filter coefficients are checked, and updated and rechecked as necessary, during each silent interval throughout a call. The first five blocks 116 to 124 of FIG. 6 are the same as those of FIG. 5 and are not described again. When the interrogation 124 indicates that the signal Y=0, then as described above this corresponds to the situation in which an appropriate set of coefficients for the transversal filter has been stored and checked.

Blocks 126, 128, and 130 determine when a signal is present on the receive path 10 or the transmit path 28. Thus the signal X is interrogated at block 126. The signal X=1 is produced if at any time during the preceding 4 ms the far end signal exceeded the threshold TH1, which is for example set to −40 dBm. If the signal X=1, then it is determined that the receive and transmit paths are not silent and a point 132 is reached. Otherwise, by means of the wait period 128 and the interrogation 130, the signals X and Y are interrogated every 4 ms and the point 132 is reached when either of the signals becomes 1, indicating the end of a silent interval. Thereafter, by means of a wait period 134 and interrogation 136, the signals X and Y are again interrogated every 4 ms and a point 138 is reached when X=Y=0, indicating the start of the next silent interval.

By means of the signal I at block 140, a pulse is supplied from the pulse generator 32 to the receive path 16 to check that the stored coefficients are still appropriate, and in subsequent interrogations 142 and 144 the signals X and Y are checked. If the signal X=1, it is assumed that a silent interval has been falsely detected and the point 132 is returned to, in order to wait for the next silent interval. Otherwise, if the signal Y=0 it is determined that the coefficients are still appropriate, and the wait period 128 is returned to, to await the end of this silent interval and then the start of the next silent interval as described above. If the signal Y=1, this indicates that either the coefficients should be changed or a near end signal has occurred, and that a further check is necessary. In this case, after a wait period 146 the signals X and Y are interrogated at block 148 to check that the silent interval has not ended. if it has ended, the point 132 is returned to as above. Otherwise, in the same manner as described above for blocks 140 to 144 another checking pulse is supplied to the receive path 16 at block 150, the signal X is interrogated at block 152 and the point 132 is returned to if X=1, and if X=0 the signal Y is interrogated at block 154. If the signal Y=0, it is assumed that the coefficients are in fact still appropriate and the block 128 is returned to as described above. The signal Y=1, however, confirms that the coefficients should be changed and accordingly the block 122 is returned to. In this case, as described above, the functions of the individual memories of the dual coefficient memory 40 are interchanged with the signal U so that the most recent set of coefficients, stored in response to the second checking pulse, is now supplied to the transversal filter, and another pulse is supplied to the receive path 16 in response to the signal I to check the appropriateness of this new set of coefficients. These operations continue as described throughout the call.

It can be seen, therefore, that the provision of the two individual memories of the dual coefficient memory 40 facilitates checking and replacement of the transversal filter coefficients to ensure their appropriateness, in that the set of coefficients in one memory can be used while another set of coefficients is stored in the other memory simultaneously with checking of the effectiveness of the first set of coefficients. Of course, only a single memory could be used if desired, the stored coefficients being checked as described above with a checking pulse supplied to the receive path 16, and then being replaced if necessary in response to a subsequent pulse supplied to the receive path 16. However, this entails slower updating of the coefficients and is less desirable for this reason.

As described above, the coefficients can be checked and updated as necessary either only at the beginning of a call (Z=1) or in each silent interval throughout a call (Z=0). It has been found that supplying one or more pulses in every silent interval can be subjectively annoying in that clicks corresponding to the pulses can be heard. In order to reduce the subjectively annoying clicks and still enable updating of the coefficients during a telephone call, the arrangement described above can be modified to provide checking pulses only in some, and not all, of the silent intervals. Thus checking pulses could be provided only in one out of every N silent intervals, where N is an integer which may be fixed or adaptively varied. Furthermore, a different number of checking pulses may be provided.

Whilst the echo canceller as described above is well suited to transmission paths for which the impulse response may vary, this is not always the case. For example, in the case of inter-office trunks the transversal filter coefficients must be determined initially and thereafter are not subject to change. In this case the echo canceller can be advantageously modified as described below with reference to FIG. 7 so that parts of it can be separated from the rest of it and provided in the form of a test set which is used only for setting the coefficients.

In this modification of the echo canceller, the pulse generator 32, coefficient monitor and control circuit 36, dual coefficient memory 40, and ADC 34 are provided in a separate test set which can be coupled to arbitrary echo cancellers via electrical connectors. These components are arranged and connected as already described, with the exceptions that: the off hook indication on the line 38 is replaced by a signal produced by manual operation of a switch; the signal Z is permanently 1; the PROM 82 produces the program command PC as described below; the comparator 76 can be dispensed with; and the output of the dual coefficient memory 40 is connected as described below. The operation of the modified arrangement is as described above with reference to FIG. 5, except that the off hook indication 116 is replaced by manual operation of the switch to produce the corresponding signal, and the extra step of producing the program command PC occurs between the blocks 124 and 126.

Figure 7:
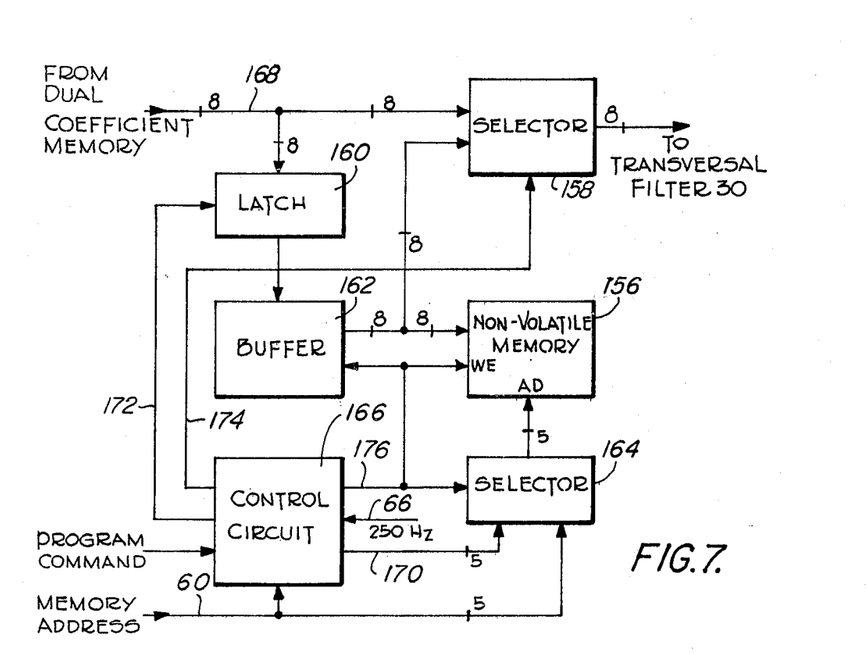
FIG. 7, which is on the same sheet as FIG. 5, illustrates an additional memory arrangement which can be used in the echo canceller.

As the dual coefficient memory 40 is now provided separately from the echo canceller, the extra circuitry shown in FIG. 7, including a 32×8-bit non-volatile memory 156 for permanently storing the determined set of transversal filter coefficients, is provided for each such echo canceller. This circuitry comprises, in addition to the memory 156, an 8-bit coefficient selector 158, an 8-bit coefficient latch 160 and tristate buffer 162, a 5-bit memory address selector 164, and a control circuit 166. The 8-bit output of the dual coefficient memory 40 is removably coupled to lines 168 leading to the latch 160 and one input of the selector 158. The program PC is removably coupled to the control circuit 166. The control circuit 166 is also supplied with the 250 Hz signal on the line 66, and supplies a 5-bit memory address to one input of the selector 164 via lines 170, control signals to the latch 160 and selector 158 via lines 172 and 174 respectively, and a control signal to the buffer 162, selector 164, and write enable input WE of the memory 156 via a line 176. The memory address on the lines 60 is supplied to the control circuit 166 and to the other input of the selector 164, whose output is connected to address inputs AD of the memory 156. The lines 168 are coupled via the latch 160 and the buffer 162 to an input/output port of the memory 156 and to the other input of the selector 158, whose output is coupled to the transversal filter 30.

In operation of this arrangement, with the test set coupled as described above a set of coefficients is determined as described with reference to FIG. 5, the coefficients being coupled from the memory 40 to the transversal filter 30 directly via the selector 158. In response to production of the program command PC, the control circuit 166 enables the output of the buffer 162, enables write-in to the memory 156, and controls the selector 164 to address the memory 156 with a relatively slowly changing 5-bit address which it generates on the lines 170. The control circuit 166 compares its generated address with that on the lines 60 and, when the addresses are the same, controls the latch 160 to store the coefficient present on the lines 168, which coefficient is then stored in the memory 156 at the correct address. This relatively slow storage of the coefficients in the memory 156 is necessary if the memory 156 is, for example, an electrically alterable PROM. When all 32 coefficients have been stored in this manner the control circuit 166, disables the output of the buffer 162, controls the memory 156 and the selector 158 for read-out of the stored coefficients via the selector to the transversal filter 30, and controls the selector 164 to supply the address on the lines 60 to the memory 156. The test set can then be disconnected from the echo canceller.

Whilst particular embodiments of the invention have been described in detail above, numerous modifications, variations and adaptations may be made thereto without departing from the scope of the invention, which is defined in the claims.

What is claimed is:

1. A method of checking suitability of stored coefficients for a transversal filter in an echo canceller in which echoes on a transmit path of signals on a receive path are cancelled by transversally filtering the receive path signals using said coefficients and subtracting the output of the transversal filter from signals on the transmit path, said method comprising:
   supplying a pulse signal to the receive path, transversally filtering said pulse signal using said coefficients, and subtracting the transversally filtered pulse signal from the resultant impulse response signal on the transmit path;
   comparing the transmit path signal after said subtraction with a threshold; and
   changing said stored coefficients if said threshold is exceeded.

2. A method as claimed in claim 1 and comprising determining and storing coefficients for the transversal filter from said resultant impulse response signal on the transmit path before said subtraction, wherein said changing said stored coefficients comprises replacing them with the determined and stored coefficients.

3. A method as claimed in claim 2 wherein said checking is repeated until said threshold is not exceeded.

4. A method as claimed in claim 3 wherein said checking is effected in response to an off-hook indication at the start of a telephone connection established via said receive and transmit paths.

5. A method as claimed in claim 4 wherein said checking is also effected during conversation pauses during the telephone connection, the method further comprising comparing the receive path signals with a threshold to determine said conversation pauses.

6. A method as claimed in claim 3 and comprising transferring the checked, stored coefficients to a non-volatile memory when said threshold is not exceeded.

7. A method as claimed in claim 1, 2, or 3 wherein the receive path is interrupted on its incoming side during the supply of said pulse signal and during the comparison, said pulse signal being supplied to the receive path on its outgoing side.

8. An echo canceller, for cancelling echoes on a transmit path of signals on a receive path, comprising:
   a transversal filter having an input coupled to the receive path;
   means for subtracting output signals of the transversal filter from signals on the transmit path;
   means for supplying pulse signals to the receive path, whereby said pulse signals are also supplied to the transversal filter;
   means for deriving a set of coefficients for the transversal filter from the impulse response, on the transmit path before the subtracting means, resulting from each pulse signal supplied to the receive path;
   first and second storage means each for storing a set of coefficients for the transversal filter;
   means for comparing the impulse response, on the transmit path after the subtracting means, with a threshold; and
   control means for controlling said supplying means to supply a pulse signal to the receive path and for selecting one of said storage means to supply a stored set of coefficients to the transversal filter and the other of said storage means to store the set of coefficients derived from the resultant impulse response, and for interchanging the selection of said storage means and repeating these steps if the comparing means establishes that said threshold is exceeded.

9. An echo canceller as claimed in claim 8 wherein the transversal filter comprises an analog storage device whose input is coupled to the receive path, and a multiplying digital-to-analog converter having an analog input coupled to the output of the analog storage device and a digital input for receiving digital coefficients from the respective one of said storage means, and wherein the means for deriving a set of coefficients from the impulse response comprises an analog-to-digital converter.

10. An echo canceller as claimed in claim 9 wherein each of said storage means comprises a random access memory.

11. An echo canceller as claimed in claim 9 wherein each of said storage means comprises a shift register.

12. An echo canceller as claimed in claim 8 and comprising further means for comparing signals on the receive path with a threshold, and wherein said control means is responsive to both said comparing means to cause said pulse signal to be supplied to the receive path during conversation pauses during a telephone connection established via said receive and transmit paths.

13. An echo canceller as claimed in claim 8 or 12 wherein said control means is responsive to an off-hook indication, at the start of a telephone connection established via said receive and transmit paths, to cause said pulse signal to be supplied to the receive path.

* * * * *